(12) United States Patent
Taylor

(10) Patent No.: US 10,671,903 B2
(45) Date of Patent: Jun. 2, 2020

(54) INTERACTIVE TOY

(71) Applicant: China Industries Limited, Wolverhampton (GB)

(72) Inventor: Graeme Taylor, Wolverhampton (GB)

(73) Assignee: China Industries Limited, Wolverhampton (GB)

(*) Notice: Subject to any disclaimer, the term of this patent is extended or adjusted under 35 U.S.C. 154(b) by 567 days.

(21) Appl. No.: 14/434,386

(22) PCT Filed: Oct. 14, 2013

(86) PCT No.: PCT/GB2013/052670
§ 371 (c)(1),
(2) Date: Apr. 8, 2015

(87) PCT Pub. No.: WO2014/060731
PCT Pub. Date: Apr. 24, 2014

(65) Prior Publication Data
US 2015/0265934 A1 Sep. 24, 2015

(30) Foreign Application Priority Data

Oct. 17, 2012 (GB) .................................. 1218670.6

(51) Int. Cl.
*G06K 19/073* (2006.01)
*A63H 33/00* (2006.01)
(Continued)

(52) U.S. Cl.
CPC ........ *G06K 19/07345* (2013.01); *A63F 13/02* (2013.01); *A63F 13/98* (2014.09);
(Continued)

(58) Field of Classification Search
None
See application file for complete search history.

(56) References Cited

U.S. PATENT DOCUMENTS 6,546,436 B1  4/2003  Fainmesser et al.
6,729,934 B1  5/2004  Driscoll et al.
(Continued)

FOREIGN PATENT DOCUMENTS

GB   2423943 A      9/2006
JP   2002306831     10/2002
(Continued)

OTHER PUBLICATIONS

International Search Report dated May 9, 2014 from International Patent Application No. PCT/GB2013/052670 filed Oct. 14, 2013.
(Continued)

*Primary Examiner* — Jason T Yen
(74) *Attorney, Agent, or Firm* — David B. Tingey; Bryant J. Keller; Kirton McConkie

(57) ABSTRACT

An interactive toy is described that provides a physical representation of an avatar created by a user within a virtual or on-line gaming environment. The interactive toy comprises a unique identifier tag and an electrical circuit the electrical circuit comprising, an identifier tag sensor and an interface that provides a means for the toy to communicate with a computer system. The inclusion of the unique identifier tag allows for a portable toy to be produced that can act as both an identifier and a scanner and so provides for increased interaction within the real world for the users of the interactive toys. As a result such toys are able to record physical meetings that can be reflected as befriending events in the corresponding virtual on-line world.

31 Claims, 5 Drawing Sheets

(51) Int. Cl.
*A63F 13/98* (2014.01)
*G06K 19/077* (2006.01)
*H01Q 1/22* (2006.01)
*A63H 3/36* (2006.01)

(52) U.S. Cl.
CPC .............. *A63H 3/36* (2013.01); *A63H 33/00* (2013.01); *G06K 19/07749* (2013.01); *H01Q 1/2225* (2013.01); *A63F 2300/556* (2013.01); *A63F 2300/5553* (2013.01); *A63H 2200/00* (2013.01)

(56) References Cited

U.S. PATENT DOCUMENTS

| | | | |
|---|---|---|---|
| 8,475,275 | B2 | 7/2013 | Weston et al. |
| 8,702,515 | B2 | 4/2014 | Weston et al. |
| 8,790,180 | B2 | 7/2014 | Barney et al. |
| 8,814,688 | B2 | 8/2014 | Barney et al. |
| 9,039,533 | B2 | 5/2015 | Barney et al. |
| 9,162,149 | B2 | 10/2015 | Weston et al. |
| 9,272,206 | B2 | 3/2016 | Weston et al. |
| 9,393,491 | B2 | 7/2016 | Barney et al. |
| 9,393,500 | B2 | 7/2016 | Barney et al. |
| 9,463,380 | B2 | 10/2016 | Weston et al. |
| 9,616,334 | B2 | 4/2017 | Weston et al. |
| 9,737,797 | B2 | 8/2017 | Barney et al. |
| 9,770,652 | B2 | 9/2017 | Barney et al. |
| 9,993,724 | B2 | 6/2018 | Barney et al. |
| 10,010,790 | B2 | 7/2018 | Weston et al. |
| 10,022,624 | B2 | 7/2018 | Barney et al. |
| 10,179,283 | B2 | 1/2019 | Barney et al. |
| 2002/0022507 | A1* | 2/2002 | Dan .......................... A63F 9/24 463/1 |
| 2002/0059153 | A1* | 5/2002 | Dan ....................... G06N 3/008 706/25 |
| 2002/0187722 | A1 | 12/2002 | Fong et al. |
| 2003/0124954 | A1* | 7/2003 | Liu ........................... A63H 3/28 446/484 |
| 2004/0038620 | A1 | 2/2004 | Small et al. |
| 2004/0115609 | A1* | 6/2004 | Cho .......................... G09B 5/00 434/365 |
| 2006/0258289 | A1* | 11/2006 | Dua ..................... H04M 1/7253 455/41.3 |
| 2006/0273909 | A1* | 12/2006 | Heiman ................. A63H 33/00 340/572.7 |
| 2007/0093172 | A1* | 4/2007 | Zheng ...................... A63H 3/28 446/268 |
| 2007/0097832 | A1* | 5/2007 | Koivisto ................... A63F 3/08 369/63 |
| 2007/0109101 | A1* | 5/2007 | Colby ................ G06K 19/0723 340/10.4 |
| 2008/0139080 | A1* | 6/2008 | Zheng ...................... A63H 3/28 446/268 |
| 2009/0088044 | A1* | 4/2009 | Yang ........................ A63H 3/28 446/297 |
| 2009/0117816 | A1 | 5/2009 | Nakamura |
| 2010/0248653 | A1* | 9/2010 | Merlin ............. G06K 19/07749 455/90.1 |
| 2011/0028219 | A1 | 2/2011 | Heatherly et al. |
| 2011/0139881 | A1* | 6/2011 | Jalkanen .......... G06K 19/07327 235/492 |
| 2012/0258802 | A1 | 10/2012 | Weston et al. |
| 2012/0295703 | A1 | 11/2012 | Reiche et al. |
| 2013/0080287 | A1* | 3/2013 | Currie ................ G06Q 30/0621 705/26.5 |

FOREIGN PATENT DOCUMENTS

| | | |
|---|---|---|
| JP | 2005-148820 A | 6/2005 |
| JP | 2007190641 | 8/2007 |
| JP | 2007-242057 A | 9/2007 |
| JP | 2011000681 | 1/2011 |
| JP | 2013-523304 A | 6/2013 |
| WO | 98/50872 A1 | 11/1998 |
| WO | 00/21203 A1 | 4/2000 |
| WO | 2008013356 A1 | 1/2008 |
| WO | WO2008013356 * | 1/2008 ............... A63H 3/28 |

OTHER PUBLICATIONS

International Preliminary Report on Patentability dated Apr. 21, 2015 from International Patent Application No. PCT/GB2013/052670 filed Oct. 14, 2013.

Office Action dated Oct. 24, 2017 from Japanese Patent Application No. JP2015-537344.

"Set up characters and make figures" Makie.Me, [online], May 24, 2012 [Search date: Oct. 13, 2017], URL: https://wired.jp/2012/05/24/makiedolls/ (Japanese).

* cited by examiner

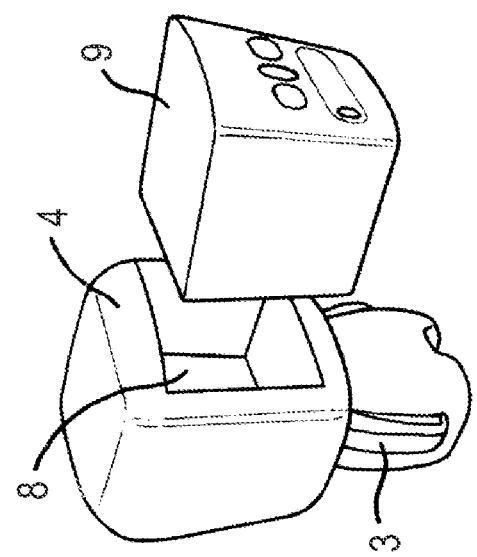
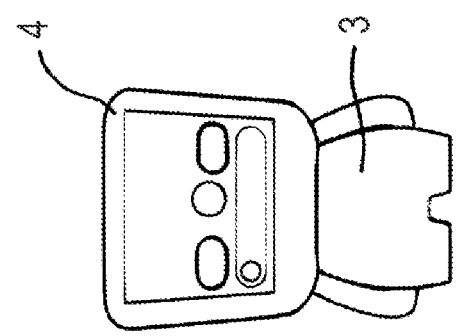
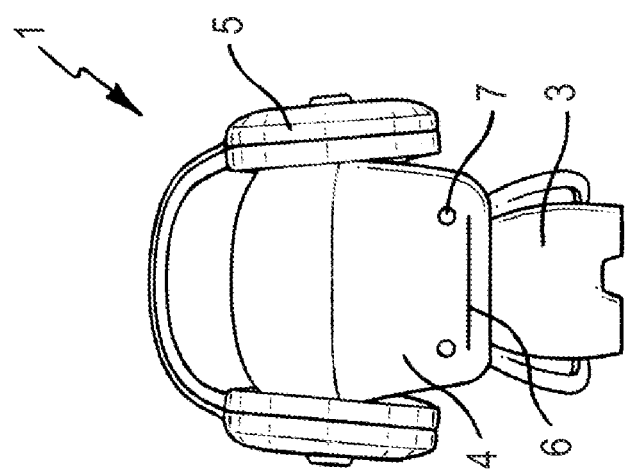

INTERACTIVE TOY

The present invention relates to the field of interactive toys and playthings. In particular, an interactive figural toy is described that provides a physical representation of an avatar created by a user within a virtual or on-line gaming environment.

Figural toys such as action figures, dolls, pets, and other forms are popular ways for both children and adults to display and interact with their favorite characters and personalities in a tangible form. Simplistic figural toys have been known in the art for many years. In general, these toys relying on the imagination of the user in order to enhance the playing experience.

Recent years have however seen a significant rise in the popularity of virtual or on-line gaming environments. These environments generally take the form of a computer-based simulated environment e.g. personal computer, smart-phone etc. through which users can interact with one another and use or create objects. These terms have become largely synonymous with interactive three dimensional virtual environments, where the users take the form of avatars visible to others. These avatars usually appear as textual, two-dimensional, or three-dimensional representations.

A number of virtual worlds have been created that are specifically targeted to younger users. Two examples of such virtual worlds are TOONIX® (see www.toonix.com) which is owned by Turner Broadcasting System Europe Limited and MOSHI MONSTERS® (see www.moshimonsters.com) which is owned by Mind Candy Limited.

In these virtual worlds children are able to design or select their own avatar. The child can then use this avatar within the virtual world in order to engage in a range of activities e.g. learning to take care of their avatar, playing games, taking part in challenges, earning virtual rewards and spending those rewards in virtual shops on virtual goods. Over time the avatars may increase in level and so be able to visit new virtual locations or unlock additional capabilities or functionality for their avatar. An avatar's owner is also provided with the facility to make virtual friends with other avatars and thereafter interact with these friends e.g. via on-line messaging services.

In today's world children are much more familiar with the Internet, social networks, and online games, and so there is an increased demand for more sophisticated toys that allow the user to benefit from real world toy interaction while still supporting the features provided within virtual, on-line worlds. US patent publication number US 2006/0273909 and US 2011/0028219 both describe interactive systems which comprise a toy that may be wirelessly connected or hardwired to a computer system suitable for providing on-line access to a virtual world. The toy may comprise a reader or sensor that allows the device to interact with an associated physical environment. Information regarding this interaction can then be relayed in real time to the virtual world environment via the computer system. Alternatively, this information can be uploaded to the virtual world environment at a later time when the toy is appropriately docked with the computer system. These systems therefore allow for on-going synchronisation between the virtual and real worlds.

It is an object of an embodiment of the present invention to provide an alternative interactive toy that is supported within a corresponding virtual on-line world and which allows for increased interaction within the real world.

SUMMARY OF INVENTION

According to a first aspect of the present invention there is provided an interactive toy comprising a unique identifier tag and an electrical circuit the electrical circuit comprising, an identifier tag sensor and an interface that provides a means for the toy to communicate with a computer system.

The inclusion of the unique identifier tag allows for a portable toy to be produced that can act as both an identifier and a scanner that provides for increased interaction within the real world for the users of the interactive toys. As a result such toys are able to record physical meetings that can be reflected as befriending events in the corresponding virtual on-line world.

Preferably the electrical circuit further comprises a short range communication device electrically connected to the identifier tag sensor.

The short range communication device may comprise an antenna. The antenna may be a conductive element that enables the interactive toy to send and receive data using radio frequencies (RF). The antenna may comprise a coil of wire, tuned to operate at 125 KHz, that couples with antennas of other appropriate devices to form a magnetic field such that data in the form of unique identifier information can be transferred between the devices.

Alternatively, the short range communication device may comprise a sound receiver that enables the interactive toy to receive data using audio codes.

It is most preferable for the unique identifier tag to comprise an active unique identifier tag. The active unique identifier tag may comprise an active electronic tag connected to an antenna. The active electronic tag may be connected to the antenna of the short range communication device.

The active unique identifier tag may comprise an active electronic tag connected to a sound generator. The sound generator may be contained within the short range communication device.

Employing active electronic tags provides for increased user privacy and increased security in relation to the information stored in connection with the interactive toy and its associated virtual-online object.

The active unique identifier tag may further comprise filtering and processing electronics.

The active unique identifier tag preferably transmits a unique identifier. The unique identifier may comprise a signal having a radio frequency (RF). Alternatively, the unique identifier may comprise an audio code.

Preferably the active electronic tag is electrically connected to the antenna of the electrical circuit. Alternatively, the active electronic tag is electrically connected to the sound generator and the sound receiver of the electrical circuit.

Preferably the electrical circuit is configured to operate in a first mode wherein the active unique identifier tag is activated to generate a unique identifier and a second mode wherein the identifier tag sensor is activated to read and store unique identifiers. With this arrangement the problematic effect of the identifier tag sensor of the interactive toy reading its own unique identifier can be eliminated.

Most preferably the electrical circuit automatically alternates between the first and second modes of operation.

Preferably the toy further comprises a power source e.g. a rechargeable battery.

The electrical circuit may comprise a user controlled switch that provides a means for connecting the power source to the electrical circuit.

Most preferably the interactive toy comprises a figural toy.

The electrical circuit preferably comprises a processor unit.

The electrical circuit may further comprise a dedicated non-volatile memory unit.

The electrical circuit may further comprise a timer.

Preferably the interface comprises a wireless connection for use with the computer system. Alternatively the interface comprises a hardwired connection for use with the computer system e.g. a Universal Serial Bus (USB) connection. In a further alternative the interface may comprise a capacitive coder.

The electrical circuit preferably provides a third mode of operation wherein the power source is recharged when the interactive toy is hardwired to a computer system.

The electrical circuit preferably provides a forth mode of operation wherein one or more identifiers stored in the identifier tag sensor are transferred to a computer system. The identifiers may either be transferred in a raw format or in an encrypted version.

According to a second aspect of the present invention there is provided a method of producing an interactive toy, the method comprising:
 selecting a toy to be made interactive;
 incorporating a unique identifier tag within the toy;
 incorporating an identifier tag sensor within the toy; and
 incorporating an interface within the toy that provides a means for the toy to exchange signals with a computer system.

Preferably selecting the toy to be made interactive comprises constructing a toy to a user defined design.

The user defined design may be generated electronically.

Most preferably the user defined design is generated by a user creating an avatar within a virtual world.

Most preferably the toy comprises a figural toy.

Incorporating the unique identifier tag within the toy may comprise incorporating an active unique identifier tag.

The method may further comprise incorporating an electrical circuit within the toy wherein the electrical circuit is configured to operate in a first mode wherein the active unique identifier tag is activated to generate a unique identifier and a second mode wherein the identifier tag sensor is activated to read and store unique identifiers.

Embodiments of the second aspect of the present invention may comprise features to implement the preferred or optional features of the first aspect of the invention or vice versa.

According to a third aspect of the present invention there is provided a gaming system, the gaming system comprising one or more interactive toys and a computer system that provides a means for accessing a virtual world wherein the virtual world comprises one or more first virtual objects corresponding to the one or more interactive toys.

Preferably the interactive toy comprises an interactive toy in accordance with the first aspect of the present invention.

Most preferably the gaming system further comprises one or more collectable toys wherein the one or more collectable toys comprise a unique identifier tag.

It is most preferable for the virtual world to further comprise one or more second virtual objects corresponding to the one or more collectable toys.

The unique identifier tag may comprise a passive RFID tag or a sound generator capable of generating an audio code.

The one or more collectable toys may comprise a figural toy.

Preferably the one or more first virtual objects comprise an avatar which shares a common identity or image with the corresponding one or more interactive toys.

In a similar manner, the one or more second virtual objects comprise an avatar which shares a common identity or image with the corresponding one or more collectable toys.

Most preferably the virtual world comprises a database that provides a means for maintaining a record of the other interactive toys physically scanned by an interactive toy.

Most preferably the database further provides a means for maintaining a record of the one or more collectable toys physically scanned by an interactive toy.

Embodiments of the third aspect of the present invention may comprise features to implement the preferred or optional features of the first or second aspects of the invention or vice versa.

BRIEF DESCRIPTION OF DRAWINGS

Aspects and advantages of the present invention will become apparent upon reading the following detailed description and upon reference to the following drawings in which:

FIG. 1 presents (a) a front; (b) a rear and (c) an exploded view of an interactive toy in accordance with an embodiment of the present invention;

Figure 2:
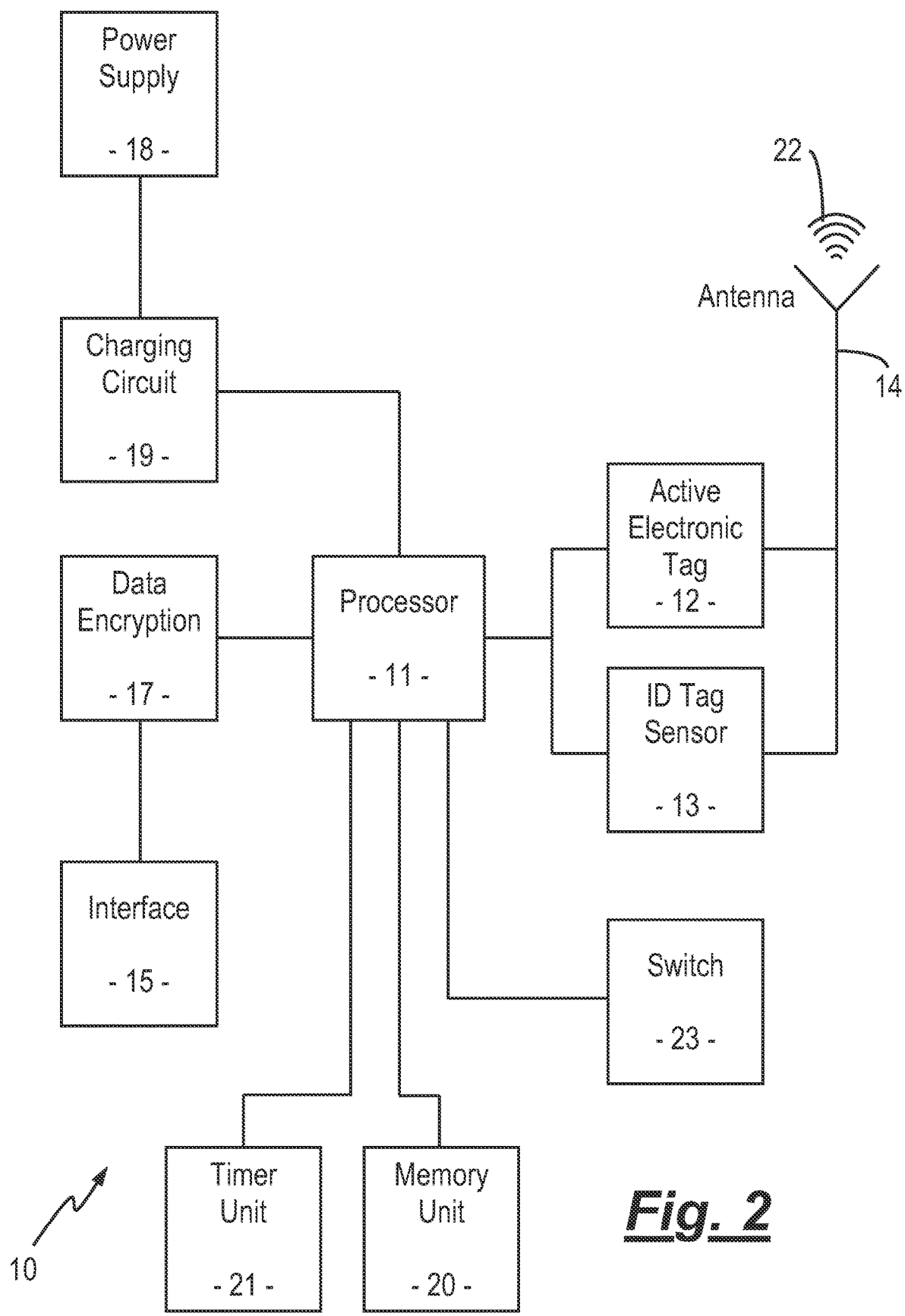
FIG. 2 presents a block diagram representation of the electrical components of the interactive toy of FIG. 1.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION

A description of an interactive toy in accordance with an embodiment of the present invention will now be described with reference to FIGS. 1 and 2. In particular FIG. 1 presents various views of the interactive toy depicted generally be reference numeral 1, while FIG. 2 presents a block diagram representation of the interactive toy 1.

In order to facilitate a gaming system 2 employing the interactive toy 1, as described in further detail below, certain design restrictions are inherent upon the interactive toy 1 in order to make the system 2 commercially viable.

In the first instance the interactive toy 1 is required to be highly portable (i.e. small enough that it can easily be carried around by a child) while providing sufficient power and memory to cope with intensive all day play from a child.

A further issue is the operating range of the interactive toy 1. As a general rule of thumb the larger an antenna the greater the associated operating range, although the shape, power supply and other physical factors can also affect this parameter. To satisfy the above portability requirements it was necessary for the antenna to be located with a volume approximately 1 inch cubed (16.39 $cm^3$) and have sufficient range to be capable of operating through interactive toys 1 exhibiting differing three dimensional shapes and sizes. However, if the operating range of the antenna was made too large unauthorised users may be able to intercept or steal information stored within the interactive toy 1. This has obvious security and privacy issues for interactive toy 1 aimed at young users.

From FIG. 1 the interactive toy 1 can be seen to comprise a modular figure that comprises a body 3, mounted upon which is a head 4. Mounted on the head 4 is headgear 5 in the form of a hat and headphones. The mouth 6 and eyes 7 on the head 4 may also be modular in nature. The head 1 further comprises a recess 8 suitable for housing an electrical components box 9, both of which are most clearly within FIG. 1(*c*). The electrical components box 9 has a volume approximately 1 inch cubed (16.39 cm$^3$) and the interactive toy 1 has an overall height of approximately three inches (7.6 cm).

From FIG. 2, the electrical components box 9 can be seen to comprise an electrical circuit 10 that comprises a processor unit 11 electrically connected to an active electronic tag 12 and a unique identifier tag sensor 13. The active electronic tag 12 and the unique identifier tag sensor 13 are electrically connected to a short range communication device in the form of an antenna 14. It will be appreciated by the skilled reader that in an alternative embodiment the active electronic tag 12 and the unique identifier tag sensor 13 could be electrically connected to separate antennas.

An interface 15 connected to the processor unit 11 provides a means for the interactive toy 1 to communicate with a computer system 16 of a gaming system 2. In the presently described embodiment the interface 15 comprises a Universal Serial Bus (USB) connection. The interface may be connected to the processor unit 11 via a data encryption unit 17.

It will however be appreciated by the skilled reader that instead of hardwiring the interactive toy 1 to the computer system 16 the interface 15 may alternatively comprise a wireless connection for communicating with the computer system 16 e.g. a Bluetooth or WiFi connection.

In an alternative embodiment the interface may comprise a capacitive coder preferably located within one or more of the feet of the interactive toy 1. As a result the interactive toy 1 can be deployed with computer system 16 that comprises a touch screen interface. When the interactive toy 1 is placed on the touch screen data communication can take place with the computer system 16. The computer system 16 may be loaded with a dedicated mobile application (App) that provides the means to automatically scan and synchronise the data.

Power for the interactive toy 1 is provided by a dedicated battery 18 which is electrically connected to the electrical circuit 10. The electrical connection may be via a charging circuit 19. The battery is preferably rechargeable. It is obviously beneficial for the electrical circuit 10 to allow the battery 18 to charge when the interactive toy 1 is connected to the computer system 16, or other similar computer system e.g. via the USB interface 15. The battery may also be recharged using a dedicated charging unit plugged into the USB interface.

A dedicated non-volatile memory unit 20 and timer unit 21 may also be connected to the processor unit 11 in order to store unique identifiers and to allow for time recordal of events experienced by the toy 1.

The antenna 14 may comprises a conductive element that enables the interactive toy 1 to send and receive data using radio frequencies (RF). In the presently described embodiment the antenna comprises of a coil of wire, tuned to operate at 125 KHz, that couples with antennas of other appropriate devices to form a magnetic field such that data in the form of a unique identifier tag 22 can be transferred between the devices.

The combination of the processor unit 11, the active electronic tag 12 and the antenna 14 provides a means for the electrical circuit 10 to operate in a first mode which allocates to, and transmits from, the interactive toy 1 a unique identifier 22. Similarly, the electrical circuit 10 may operate in a second mode wherein the combination of the antenna 14, the identifier tag sensor 13 and the processor unit 11 provides a means for the interactive toy 1 to read unique identifier tags both of the active type employed by the interactive toy 1 itself and from the more traditional passive RFID tags known in the art.

In order to reduce power consumption within the interactive toy 1 it is preferable for the processor unit 11 to be connected to the power supply only when a switch 23 is activated by a user. In order to avoid the unique identifier tag sensor 13 constantly reading its own unique identifier tag and thus necessitating more complex filtering and/or collision arbitration protocol techniques further control is required to be introduced into electrical circuit 10. In the presently described embodiment the unique identifier tags comprises an active unique electronic tag 12, therefore the simplest solution to this problem is for the processor unit 11 to be configured to automatically alternate the electrical circuit 10 between its first and second modes of operation. In this way the interactive toy 1 alternates between transmitting its unique identifier 22 and reading unique identifier tags within its operating range. However, since these two modes of operation are never simultaneously active the interactive toy 1 can never read its own unique identifier 22.

Alternating in this way between operating modes has the further advantage that it acts to further reduce the power consumption of the interactive toy 1 and so increases the lifetime of its power supply 18.

Figure 3:
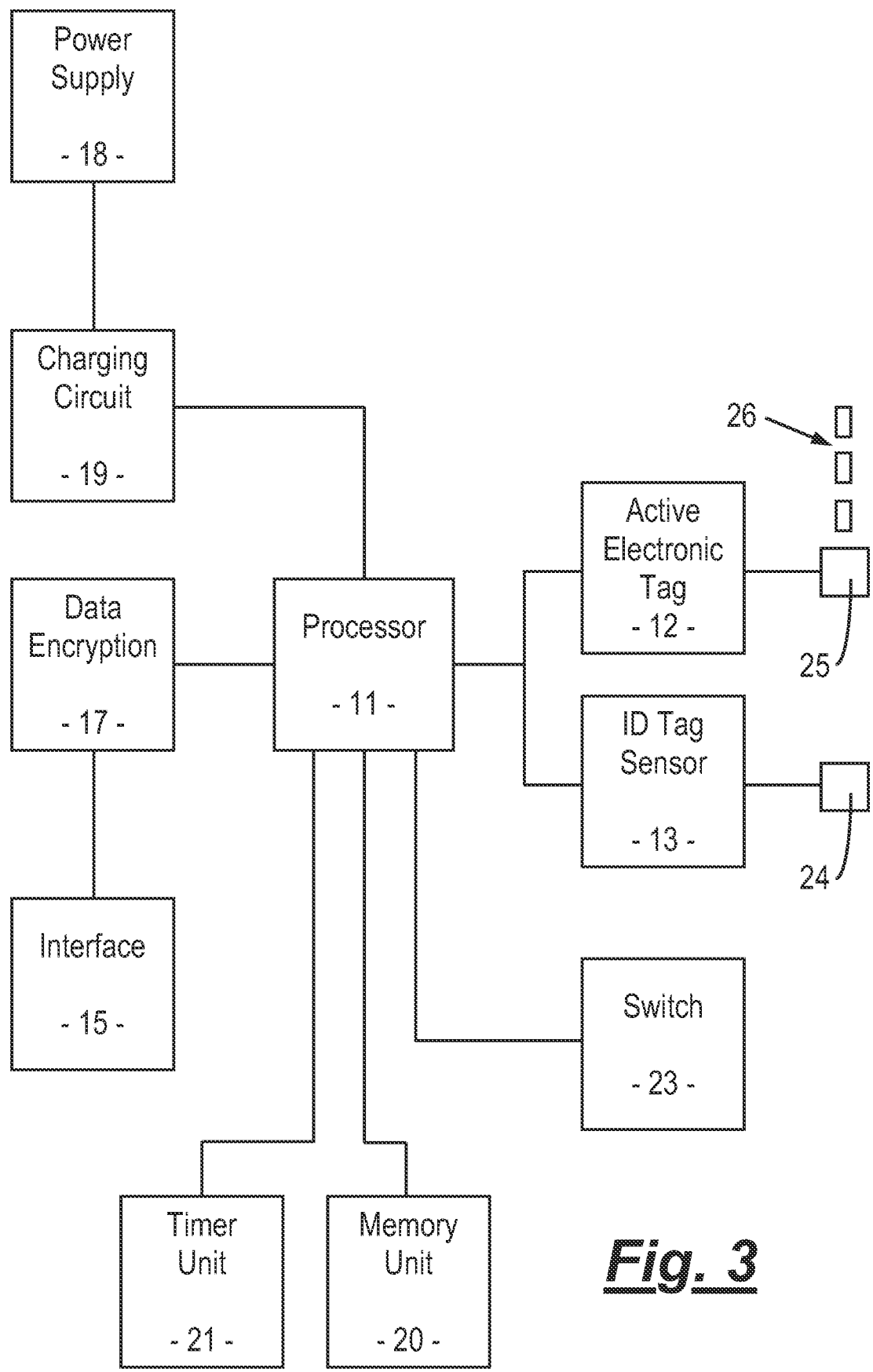
FIG. 3 presents a block diagram representation of an alternative embodiment of the electrical components of the interactive toy of FIG. 1.

An alternative embodiment of the electrical circuit 10*b* of the interactive toy 1 is presented in FIG. 3. In this embodiment the electrical circuit 10*b* shares the majority of the components previously described with reference to FIG. 2. However, the short range communication device has been modified i.e. the antenna 14 has been replaced or by a sound receiver 24 e.g. a microphone and a sound generator 25 e.g. an audio speaker. As a result the electrical circuit 10*b* enable the interactive toy 1 to send and receive data using audio codes 26. Preferably the audio codes 26 are selected to be inaudible to the normal human hearing range (typically 20 Hz to 15 kHz). This may be achieved by employing pulsed audio frequencies outside of this frequency range or by disguising the audio codes within other sounds generated by the interactive toy 1.

Typically the audio codes have a duration of around 50 to 100 ms.

It will be appreciated by those skilled in the art that the sound receiver 24 and the sound generator 25 may comprise a single component. As a result the costs associated with employing audio codes within the interactive toy 1 can be made commercially viable.

In a further alternative embodiment the electrical circuit 10*b* may further comprise the antenna 14 so as to provide it with a means for detecting unique passive RFID tag 30 associated with collectable toys 27, 28 and 29, as described in further detail below.

As described above, the electrical circuit 10*b* can operate in a first mode which allocates to, and transmits from, the interactive toy 1 a unique identifier 22. Similarly, the electrical circuit 10*b* may operate in a second mode wherein the combination of the sound receiver 24, the identifier tag sensor 13 and the processor unit 11 provides a means for the interactive toy 1 to read unique identifier tags.

It will be appreciated by the skilled reader that in an alternative embodiment the active electronic tags 12 for producing a unique identifier 22 could be replaced by more traditional passive RFID tags employed to function as the desired unique identifier tag. However, this embodiment is less preferable since filtering and/or collision arbitration protocol techniques would have to be introduced to the electrical circuit 10 in order to overcome the problem of the interactive toy 1 reading its own unique identifier tag during normal operation.

Another reason why active electronic tags 12 are preferable to traditional RFID tags is for reasons of security of the information stored in connection with the interactive toy 1 and its associated virtual-online object and privacy of the user in connection with known privacy concerns of traditional RFID tags such as tracking, unauthorised detection of the toy by third parties or user profiling. As described above since the active electronic tag 12 is only activated and the unique identifier 22 transmitted when the switch 23 is activated this feature acts to further enhance the security and privacy of the interactive toy 1. However, traditional RFID tags are passive and can be read without any need to be 'switched on', potentially making them vulnerable to scanning by anyone who can get within range. However since the unique identifier 22 will only be transmitted when the active electronic tag 12 is activated (i.e. when switch 23 is pressed by the user) such embodiments are significantly less vulnerable to unwanted scanning.

An additional benefit of employing active electronic tags 12 is that the range of the interactive toy 1 is easier to set and vary if required. A typical range for the active electronic tag 12 is around 5 cm. In practice a 50% greater range has been achieved by employing active electronic tags 12 as opposed to traditional RFID tags.

The electrical circuits 10 and 10b may provide a forth mode of operation wherein the stored identifiers are transferred to the computer system 16. The identifiers may either be transferred in a raw format or in an encrypted version to minimise abuse of the system such as reader spoofing (creating fake interactive toys or variants thereof) or phishing attacks (guessing at predictable unique identifiers to gain the advantages of having legitimately obtained them).

Method of Producing an Interactive Toy

Figure 4:
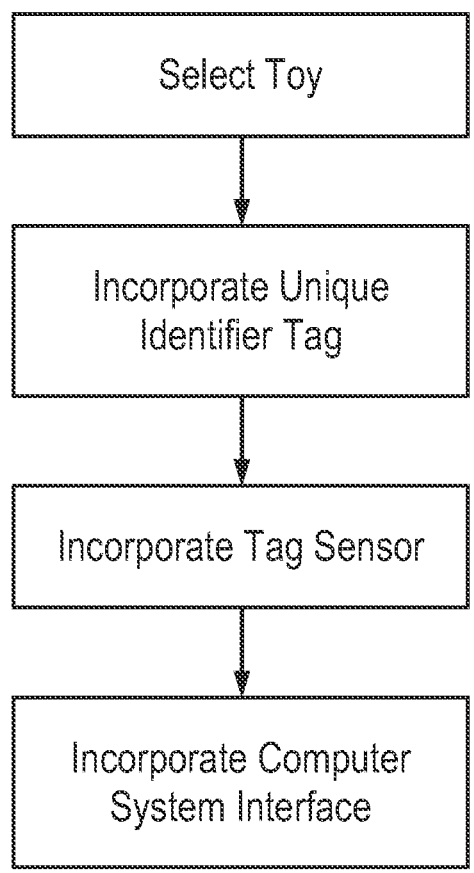
FIG. 4 presents a flow chart of a method of producing the interactive toy of FIG. 1.

A method of producing an interactive toy is now provided with reference to the flow chart of FIG. 4. The first step involves the selection of a toy that is desired to be made interactive. This may involve the simple selection of a preformed toy. It is however more preferable for this stage of the process to involve a user electronically designing their bespoke figural toy for example the user may design their toy through the creation of an avatar within a virtual world.

Often the design of an avatar within a virtual world involves the selection of modular components from a number of individual sets of components. For example the user may be directed to select a body 3, a head 4, a set of headgear 5, a mouth 6 and a set of eyes 7 from a predetermined set of such components. These components can then be formed into the toy by assembly of these user defined components.

The next stage in producing the interactive toy is to incorporate a unique identifier tag within the toy. This is preferably achieved by incorporating an active means for generating a unique identifier 22. An alternative would be to incorporate a more traditional physical passive RFID tag.

The next stage in the process involves the incorporation of an identifier tag sensor 13 within the toy. The sensor 13 is required to be positioned so that it can read unique identifiers 22 that come into close proximity with the toy i.e. typically within a 5 cm radius.

The final stage in forming the interactive toy involves incorporating an interface 15 within the toy that provides a means for the toy to exchange signals with a computer system 16 of a gaming system 2. In the presently described embodiment the interface 15 comprises a Universal Serial Bus (USB) connection. It will however be appreciated by the skilled reader that instead of hardwiring the interactive toy 1 to the computer system 16 the interface 15 may alternatively comprise a wireless connection for communicating with the computer system 16 e.g. a Bluetooth or WiFi connection or a capacitive coder.

The above described embodiments of the interactive toy 1 may suffer from the problem that the identifier tag sensor 13 is within range of its own unique identifier 22 and so could constantly be reading its own unique identifier 22. When the unique identifier 22 is provided by an active electronic tag 12 a solution to this problem is to incorporate an electrical circuit 10 within the toy wherein the electrical circuit 10 is configured to operate in two distinct modes. When operating in the first mode the active unique identifier tag is activated to generate a unique identifier. By contrast when operating in a second mode the identifier tag sensor is activated to read and store unique identifiers.

For embodiments where the unique identifier tag is an RFID tag then the solution to this problem is somewhat more complex and thus expensive to implement. In this embodiment filtering and/or collision arbitration protocol techniques are required to be introduced to the electrical circuit 10.

The above method may further comprise incorporating the electrical circuit 10 and battery 17 within the toy.

In the preferred embodiment the electrical circuit 10 is housed within the electronic components box 9. As such, by locating the electronic components box 9 within a recess 8 formed within the head 4 the steps of incorporating the active electronic tag 12, the identifier tag sensor 13, the interlace 15 the electrical circuit 10 and the battery 18 within the toy 1 can be completed simultaneously.

Gaming System

Figure 5:
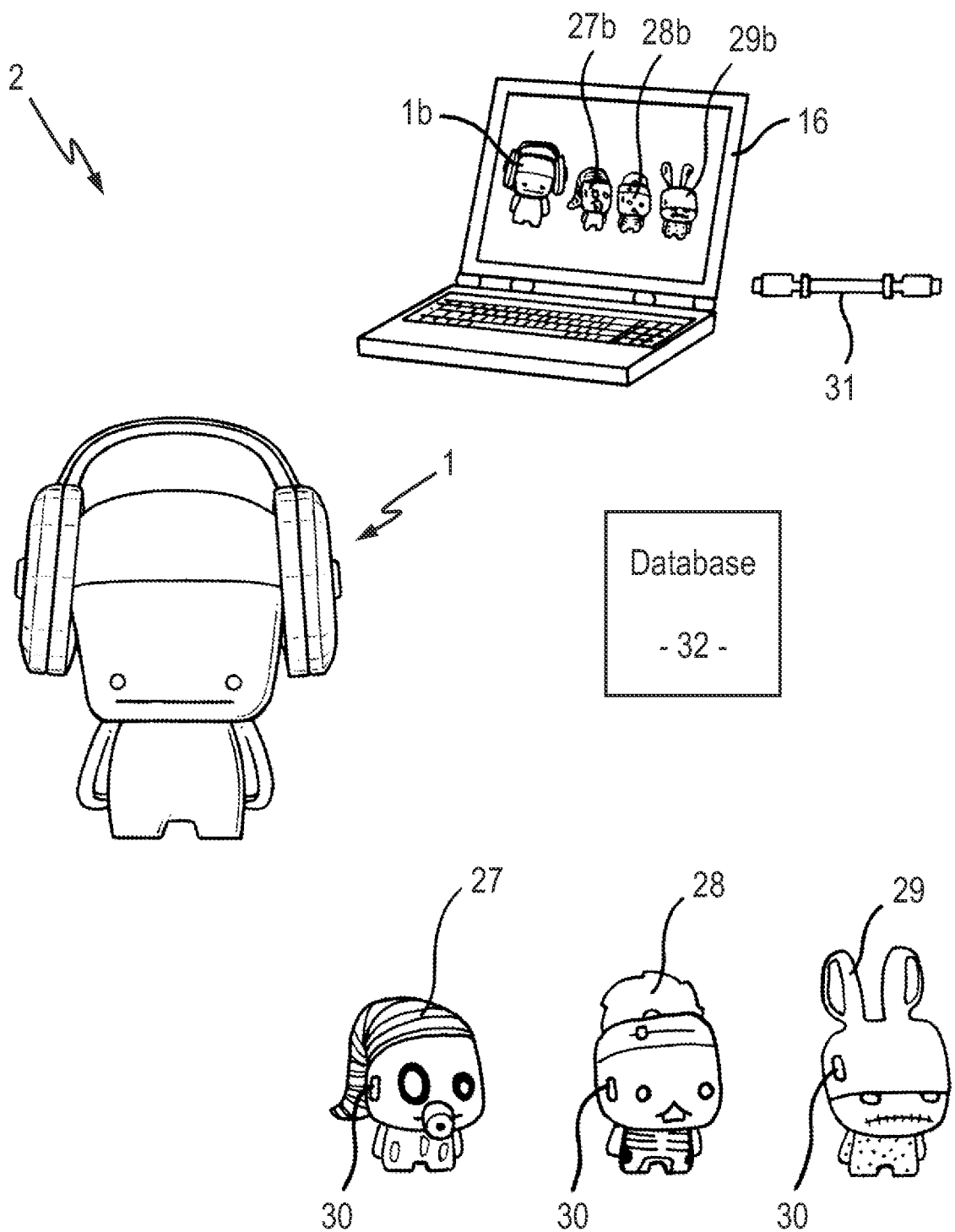
FIG. 5 presents a schematic representation of a gaming system in accordance with an embodiment of the present invention.

A gaming system that incorporates one or more of the above described interactive toys 1 will now be described with reference to FIG. 5. In particular, FIG. 5 presents an interactive toy 1, a computer system 16 that provides a means for accessing a virtual world and three collectable toys 27, 28 and 29. The collectable toys 27, 28 and 29 can be seen to comprise 1½ inch (3.8 cm) figural toys each of which comprises a unique identifier tag, preferably in the form of a unique passive RFID tag 30. As a result, each interactive toy 1 and FIGS. 27, 28 and 29 is a unique entity that can be scanned by each interactive toy 1 when in close proximity to each other and a record of these real world interactions can then be stored within the memory of the interactive toys 1.

In the presently described embodiment a USB cable 31 provides a means for connecting the interactive toy 1 to the computer system 16 and thus to a corresponding virtual on-line world. As can be seen from FIG. 5, the virtual world comprises virtual objects or avatars corresponding to the interactive toy 1 and each of the collectable toy FIGS. 27, 28 and 29 as denoted by reference numerals 1b, 27b, 28b and 29b, respectively. Connection of the interactive toy 1 to the computer system 16 therefore allows for synchronisation to take place between the interactions of interactive toy 1 and the collectable toy FIGS. 27, 28 and 29 in the real world and their corresponding avatars 1*b*, 27*b*, 28*b* and 29*b* in the virtual on-line world. This provides for enhanced gaming opportunities for users, as will now be described in further detail.

The virtual world preferably comprises a database 32. The database 32 provides a means for maintaining a record of the other interactive toys 1 and collectable toys 27, 28 and 29 physically scanned by a particular interactive toy.

A unique selling point of all of the interactive toys 1 is that each toy has an associated unique identifier 22 that can be read by an identifier tag sensor 13 and then uploaded to a user's computer system 16. Scanning a unique identifier 22 may give a user access to an avatar for a new interactive toy 1 within the corresponding virtual world, give their virtual or real world avatar additional features or capabilities or grant access to exclusive content within that virtual world.

The incorporation of the passive RFID tag 30 within the collectable toys 27, 28 and 29 makes each of these toys tradable and trackable. The passive RFID tag 30 also provide a means for statistics to be recorded against each collectable toys 27, 28 and 29, for example how many previous owners, how many miles travelled, how many countries visited etc.

The collectable toys 27, 28 and 29 may be sold in waves. Each wave consists of multiple designs and could be packed in equal or variable ratios (giving rise to "chase" figures). As each figurine contains a unique passive RFID tag 30 that can be scanned by an interactive toy 1 and uploaded to a user's virtual world a user can build a profile for their interactive toys 1 and start building a network of friends.

The collectable toys 27, 28 and 29 may be delivered in a number of different ways, e.g.:
  individually in high visibility packs
  individually in blind packs
  in multiples in starter packs or play sets.

A foil or mesh than is impermeable to RF signals is required to be incorporated in the packaging of the so as to prevent any unauthorised pre-sale scanning.

The collectable toys 27, 28 and 29 may comprise signature, character or custom made figurines. These are essentially the same as the collectable toys 27, 28 and 29 described above but are designed by celebrities; are decorated to resemble licensed characters; or are designed on-line by a user. Obtaining one of these signature characters or custom made figurines may give a user access to the celebrity's profile as well as special on-line content.

In an alternative embodiment the RFID tag 30 of the collectable toys 27, 28 and 29 may be replaced with a sound generator capable of emitting a unique identifier in the form of an audio code.

The described interactive toys have a number of advantages over those interactive toys known in the art. The inclusion of the unique identifier tag allows for a portable toy to be produced that can act as both an identifier and a scanner and so provides for increased interaction within the real world of the interactive toys. As a result such toys are able to record physical meetings that can be reflected as befriending events in the corresponding virtual on-line world.

Employing an active unique identifier tag within the interactive toy provides for increased security in relation to the information stored in connection with the interactive toy and its associated virtual-online object. Active unique identifier tags also provide a means for eliminating the problematic effect of the identifier tag sensor of the interactive toy reading its own unique identifier.

The described method of producing an interactive toy is highly flexible and is not limited to any particular type of toy. For example it may be applied retrospectively to a child's favourite toy as long as a corresponding avatar can be created in the corresponding on-line world. Alternatively, it can be activated upon the design of the avatar within the on-line world. In both cases the method acts to increase the interaction for a user between a virtual world and the real world.

The interactive toys further enhance the interaction for a user between a virtual world and the real world through their employment within the described gaming system. In particular, by including collectable toys, each having a unique identifier tag, allows for increased opportunities for a user to interact between these worlds and hence increase the enjoyment experienced by a user.

An interactive toy is described that provides a physical representation of an avatar created by a user within a virtual or on-line gaming environment. The interactive toy comprises a unique identifier tag and an electrical circuit the electrical circuit comprising, an identifier tag sensor and an interface that provides a means for the toy to communicate with a computer system. The inclusion of the unique identifier tag allows for a portable toy to be produced that can act as both an identifier and a scanner and so provides for increased interaction within the real world for the users of the interactive toys. As a result such toys are able to record physical meetings that can be reflected as befriending events in the corresponding virtual on-line world.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An interactive toy comprising a unique identifier tag and an electrical circuit, wherein the electrical circuit comprises an identifier tag sensor and an interface that provides a means for the toy to communicate with a computer system wherein the electrical circuit is configured to automatically alternate between a first mode of operation wherein the active unique identifier tag is activated to allocate and transmit a unique identifier tag and the identifier tag sensor is prevented from reading and storing unique identifiers, and a second mode of operation wherein the identifier tag sensor is activated to read and store unique identifiers and the active unique identifier tag is prevented from allocation and transmitting a unique identifier tag.

2. The interactive toy as claimed in claim 1 wherein the electrical circuit further comprises a short range communication device.

3. The interactive toy as claimed in claim 2 wherein the short range communication device comprises an antenna electrically connected to the identifier tag sensor.

4. The interactive toy as claimed in claim 3 wherein the antenna comprises a conductive element that enables the interactive toy to at least one of (i) send and (ii) receive data using a radio frequency (RF).

5. The interactive toy as claimed in claim 2 wherein the short range communication device comprises a sound receiver electrically connected to the identifier tag sensor wherein sound receiver enables the interactive toy to receive data using audio codes.

6. The interactive toy as claimed in claim 1 wherein the active unique identifier tag comprises an active electronic tag connected to an antenna.

7. The interactive toy as claimed in claim 6 wherein of the active electronic tag is connected to the antenna of the short range communication device.

8. The interactive toy as claimed in claim 1 wherein the active unique identifier tag comprises an active electronic tag connected to a sound generator.

9. The interactive toy as claimed in claim 8 wherein the sound generator is contained within the short range communication device.

10. The interactive toy as claimed in of claim 1 wherein the active unique identifier tag further comprises filtering and processing electronics.

11. The interactive toy as claimed in claim 1 wherein the active unique identifier tag transmits a unique identifier.

12. The interactive toy as claimed in claim 11 wherein the unique identifier comprises a signal having a radio frequency (RF).

13. The interactive toy as claimed in claim 11 wherein the unique identifier comprises a signal comprising an audio code.

14. The interactive toy as claimed in claim 1 wherein the active electronic tag is electrically connected to the antenna of the electrical circuit.

15. The interactive toy as claimed in claim 1 wherein the active electronic tag is electrically connected to the sound generator of the electrical circuit.

16. The interactive toy as claimed in claim 1 wherein the interactive toy further comprises a power source.

17. The interactive toy as claimed in claim 16 wherein the electrical circuit comprises a user controlled switch that provides a means for connecting the power source to the electrical circuit.

18. The interactive toy as claimed in claim 1 wherein the interactive toy comprises a figural toy.

19. The interactive toy as claimed in claim 1 wherein the electrical circuit further comprises a processor unit.

20. The interactive toy as claimed in claim 1 wherein the electrical circuit further comprises a dedicated non-volatile memory unit.

21. The interactive toy as claimed in claim 1 wherein the electrical circuit further comprises a timer.

22. The interactive toy as claimed in claim 1 wherein the interface comprises a wireless connection for use with the computer system.

23. The interactive toy as claimed in claim 1 wherein the interface comprises a hardwired connection for use with the computer system.

24. The interactive toy as claimed in claim 1 wherein the interface comprises a capacitive coder for use with the computer system.

25. The interactive toy as claimed in claim 23 wherein the electrical circuit provides a third mode of operation wherein the power source is recharged when the interactive toy is hardwired to a computer system.

26. The interactive toy as claimed in claim 1 wherein the electrical circuit provides a forth mode of operation wherein one or more identifiers stored within the identifier tag sensor are transferred to a computer system.

27. A method of producing an interactive toy, the method comprising:
    selecting a toy to be made interactive;
    incorporating a unique identifier tag within the toy;
    incorporating an identifier tag sensor within the toy; and
    incorporating an interface within the toy that provides a means for the toy to exchange signals with a computer system; and
    incorporating an electrical circuit within the toy wherein the electrical circuit is configured to automatically alternate between a first mode of operation wherein the active unique identifier tag is activated to allocate and transmit a unique identifier tag and the identifier tag sensor is prevented from reading and storing unique identifiers, and a second mode of operation wherein the identifier tag sensor is activated to read and store unique identifiers and the active unique identifier tag is prevented from allocation and transmitting a unique identifier tag.

28. The method of producing an interactive toy as claimed in claim 27 the selection of the toy to be made interactive comprises constructing a toy to a user defined design.

29. The method of producing an interactive toy as claimed in claim 28 wherein the user defined design is generated electronically.

30. The method of producing an interactive toy as claimed claim 28 wherein the user defined design is generated by a user creating an avatar within a virtual world.

31. The method of producing an interactive toy as claimed in claim 27 wherein the toy comprises a figural toy.

* * * * *